US009458351B2

(12) United States Patent
Becker et al.

(10) Patent No.: US 9,458,351 B2
(45) Date of Patent: Oct. 4, 2016

(54) TWO-COMPONENT COATING COMPOSITIONS

(75) Inventors: Wiebke Becker, Essen (DE); Katharina Dreger, Duesseldorf (DE); Carmen Flosbach, Wuppertal (DE)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 0 days.

(21) Appl. No.: 14/115,077

(22) PCT Filed: May 3, 2012

(86) PCT No.: PCT/US2012/036245
§ 371 (c)(1),
(2), (4) Date: Jan. 3, 2014

(87) PCT Pub. No.: WO2012/151357
PCT Pub. Date: Nov. 8, 2012

(65) Prior Publication Data
US 2014/0106075 A1    Apr. 17, 2014

Related U.S. Application Data

(60) Provisional application No. 61/481,770, filed on May 3, 2011.

(51) Int. Cl.
C09D 163/00 (2006.01)
C08G 18/62 (2006.01)
C08G 18/79 (2006.01)
C09D 175/04 (2006.01)
C08G 18/22 (2006.01)
C08G 18/24 (2006.01)

(52) U.S. Cl.
CPC ............. *C09D 163/00* (2013.01); *C08G 18/22* (2013.01); *C08G 18/246* (2013.01); *C08G 18/6229* (2013.01); *C08G 18/6254* (2013.01); *C08G 18/6258* (2013.01); *C08G 18/792* (2013.01); *C09D 175/04* (2013.01)

(58) Field of Classification Search
CPC ............ C08G 18/6258; C08G 18/792; C08G 18/6229; C08G 18/6254; C08G 18/22; C08G 18/246; C09D 175/04; C09D 163/00
USPC ...................................................... 427/385.5
See application file for complete search history.

(56) References Cited

U.S. PATENT DOCUMENTS

| 7,923,113 | B2 | 4/2011 | Dogan et al. |
| 2007/0197727 | A1 | 8/2007 | Lewin et al. |
| 2008/0234410 | A1 | 9/2008 | Van Engelen et al. |

FOREIGN PATENT DOCUMENTS

| EP | 0677541 A1 | 10/1995 |
| EP | 1193279 A2 | 4/2002 |
| WO | 0192362 A1 | 12/2001 |

OTHER PUBLICATIONS

National Industrial Chemicals Notification and Assessment Scheme (NICNAS) Full Public Report on Polymer in Setalux 1157 XS-54 (Jan. 2007).*
ISA EPO, International Search Report for Application No. PCT/US2012/036245, dated May 28, 2013.
ISA European Patent Office, International Preliminary Report on Patentability mailed Nov. 14, 2013 for International Application No. PCT/US2012/036245.
European Patent Office, Office Action for EP Application No. 12728861.1, dated Sep. 12, 2014.

* cited by examiner

*Primary Examiner* — Robert S Walters, Jr.
(74) *Attorney, Agent, or Firm* — Lorenz & Kopf LLP

(57) ABSTRACT

Two-component coating compositions include: A) a cross-linkable binder compound having at least one functional group reactive towards isocyanate groups, B) a cross-linking agent having at least one free isocyanate group and C) a catalyst component comprising C1) a catalyst for the for the curing reaction between the functional groups of component A) and the isocyanate groups of component B), the catalyst C1) being an organo-metal compound, and C2) an oligomeric or polymeric binder compound having a glass transition temperature Tg of ≥about 20° C., measured by DSC (differential scanning calorimetry) at a heating rate of 10 K/min. The glass transition temperature Tg of the binder compound C2) is above the temperature at which the two-component coating composition is applied, preferably about 10° C. above the temperature at which the two-component coating composition is applied.

16 Claims, No Drawings

TWO-COMPONENT COATING COMPOSITIONS

CROSS-REFERENCE TO RELATED APPLICATIONS

This application is a U.S. National-Stage entry under 35 U.S.C. §371 based on International Application No. PCT/US2012/036245, filed May 3, 2012 which was published under PCT Article 21(2) and which claims priority to U.S. Application No. 61/481,770, filed May 3, 2011, which are all hereby incorporated in their entirety by reference.

TECHNICAL FIELD

The technical field relates to two-component coating compositions which contain cross-linkable binders with reactive functional groups, polyisocyanate cross-linking agents and a latent catalyst for the curing reaction.

BACKGROUND

Two-component coating compositions based on a hydroxyl-functional binder component and a polyisocyanate cross-linking agent are widely used in vehicle painting and industrial painting, particularly also in vehicle refinishing, owing to the very good technological properties of these coating compositions. The coating compositions are used in both water-based and solvent-based form.

Owing to tighter environmental law requirements, however, it is becoming increasingly necessary to use water-based coating compositions. Of course, paint manufacturers are anxious to provide such water-based coating, which are also at least on a par with solvent-based paints in terms of technological properties. Some effort was and still is required to this end, as solvent-based paint systems cannot automatically be switched 1:1 to water-based ones. For example, it is in the nature of water-based paints based on polyisocyanate cross-linking agents that secondary reactions occur between the water and the polyisocyanates. Owing to these secondary reactions, surface defects in the applied paint film may in turn occur. In this way, for example, so-called bubbles or pinholes may appear. It is known that the tendency for bubbles to form can be reduced by extending the flash-off time of the applied water-based coating. However, this lengthens the total process time, which in turn is not acceptable for certain applications, for example for vehicle refinishing applications.

A short drying time of the applied coating composition at moderate temperatures, for example from room temperature to approx. 60° C., is also necessary in vehicle refinishing applications. The drying and curing times may be considerably reduced by using catalysts for the cross-linking reaction. However, at the same time the use of catalysts generally also leads to a reduction of the pot life, i.e. to a reduction of the time within which the coating can still be processed and applied faultlessly.

Various approaches are known for eliminating the above-mentioned problem. For example, it is proposed to introduce the catalyst for the reaction between polyisocyanates and binders having groups capable of reacting with polyisocyanates not into the two-component coating composition or the layer of paint resulting therefrom itself, but rather into another layer of paint located thereabove or therebelow. In addition, U.S. Pat. No. 5,578,345 and WO 2007/068683, for example, disclose methods for multi-layer coating, wherein a clear coat composition based on a polyisocyanate cross-linking agent and a hydroxyl- and/or mercapto-functional binder is being applied in a multi-layer construction on a base coat layer which contains a catalyst for the cross-linking reaction in the clear coat. In this case, the catalyst is intended to migrate through the interface between the two coating layers and into the clear coat layer, after application of the clear coat composition, and therein to catalyze the cross-linking reaction. Since the two-component paint itself does not contain a catalyst, satisfactory processing times are achieved. However, a disadvantage of this method is that it can be difficult to control in a purposeful manner the migration of the catalyst into the layer of paint to be cross-linked, for example the layer of clear coat. As a result, over- or under-catalyzing can easily occur, which may for example lead to insufficient through-curing or to an unsatisfactorily long drying time.

Furthermore, it is known from WO 01/92362 to use photo-latent catalysts, for example amines, in coating compositions based on a polyisocyanate cross-linking agent and a mercapto-functional binder. The photo-latent catalyst is inactive in the coating itself and is only activated after the application of high-energy radiation by irradiation. In this way, an extended pot life can also be achieved. However, additional UV-lamp equipment is required for this purpose and sensitizers such as thioxanthones or benzophenones must be used in addition to the photo-latent catalysts.

Therefore, there remains a need for two-component coating compositions with a good balance between acceptable processing time (pot life) and short drying time, and in particular a need for water-based two-component coating compositions based on a binder component which is reactive with polyisocyanates and a polyisocyanate cross-linking agent, which result in perfect coats without surface defects in an acceptable total process time of the drying process. In addition, there remains a need for a water-based coating composition having a sufficient processing time and producing coating layers with very good technological properties, for example, very good hardness and resistance to chemicals and water. In addition, other objects, desirable features and characteristics will become apparent from the subsequent summary and detailed description, and the appended claims, taken in conjunction with the accompanying drawings and this background.

SUMMARY

This invention relates to two-component coating compositions, comprising:
A) a cross-linkable binder having a functional group reactive towards isocyanate groups,
B) a cross-linking agent having a free isocyanate group and
C) a catalyst component comprising:
 C1) a catalyst for the curing reaction between the functional groups of component A) and the isocyanate groups of component B), the catalyst being an organo-metal compound, and
 C2) an oligomeric or polymeric binder compound having a glass transition temperature Tg of ≥20° C., measured by DSC (differential scanning calorimetry) at a heating rate of 10 K/min, wherein the glass transition temperature Tg of binder compound C2) is above the temperature at which the two-component coating composition is applied.

Preferably the glass transition temperature Tg of binder compound C2) is at least 10° C., more preferred at least 20° C. above the temperature at which the two-component coating composition is applied. Typically two-component coating compositions are applied at ambient temperature, for example at temperatures of 15 to 25° C.

The various embodiments also relate to a process for coating a substrate, comprising the steps:

I) applying a layer of the above two-component coating composition to a substrate at application temperature $T_A$, and II) curing the coating layer, wherein the glass transition temperature Tg of the binder compound C2) is above the application temperature $T_A$, preferably is at least 10° C., more preferred at least 20° C. above the application temperature $T_A$.

Two-component and other coating compositions are usually applied at room temperature or ambient temperature (=application temperature $T_A$). Room temperature and ambient temperature are usually in a range of from about 10 to about 30° C., preferably about 15 to about 25° C. for coating applications.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

These and other features and advantages will be more readily understood, by those of ordinary skill in the art, from a reading of the following detailed description. It is to be appreciated those certain feature, which are, for clarity, described above and below in the context of separate embodiments, may also be provided in combination in a single embodiment. Conversely, various features that are, for brevity, described in the context of a single embodiment, may also be provided separately or in any sub-combination. In addition, references in the singular may also include the plural (for example, "a" and "an" may refer to one, or one or more) unless the context specifically states otherwise.

The term (meth)acrylic as used here and hereinafter should be taken to mean methacrylic and/or acrylic.

Unless stated otherwise, all the molar mass data, number-average molar mass data Mn or weight-average molar mass data Mw stated in the present description are molar masses determined or to be determined by gel permeation chromatography (GPC; divinylbenzene-crosslinked polystyrene as the immobile phase, tetrahydrofuran as the liquid phase, polystyrene standards).

The phrase "groups reactive towards isocyanate groups" used herein in particular means groups capable of addition reaction with isocyanate groups.

The glass transition temperature Tg has been measured by DSC (differential scanning calorimetry) according to standard DIN 53 765 at a heating rate of 10 K/min. The glass transition temperature Tg used herein is the extrapolated end temperature TgEE as defined in standard DIN 53 765.

The coating compositions contemplated herein can be water-based coating compositions.

Water-based coating compositions are coating compositions, wherein water is used as solvent or thinner when preparing and/or applying the coating composition. Usually, aqueous coating compositions contain 20 to 80% by weight of water, based on the total amount of the coating composition and optionally, up to 15% by weight, preferably, below 10% by weight of organic solvents, based on the total amount of the coating composition.

The coating compositions are two-component coating compositions. The handling of two-component coating compositions generally requires mixing together the reactive components shortly before application to avoid premature reaction of the reactive components. The term "shortly before application" is well-known to a person skilled in the art handling two-component coating compositions. The time period within which the ready-to-use coating composition may be prepared prior to the actual use/application depends, e.g., on the pot life of the coating composition.

The pot life is the time within which, once the mutually reactive components of a coating composition have been mixed, the coating composition may still be properly processed or applied and coatings of unimpaired quality can be achieved.

The coating compositions contemplated herein comprise the components A), B) and C).

Components A) and B) which are reactive with each other shall be stored separately and mixed together only shortly before application. Component C) can be either part of component A) and/or B) or a separate component. Component C) cannot be a part of component B), if binder component C2) contains functional group reactive towards isocyanate groups. Preferably component C) is part of component A).

Usually the coating compositions contemplated herein comprise about 20 to about 80% by weight, preferably about 30 to about 70% by weight of the component A) and about 20 to about 80% by weight, preferably about 30 to about 70% by weight of the cross-linking agent B), relative to the entire coating composition.

Component A) of the coating composition comprises monomeric, oligomeric or polymeric compounds with functional groups reactive towards isocyanate groups. These compounds can be compounds with low molar mass defined by empirical and structural formula or oligomeric or polymeric binders. The binders are compounds with a number average molar mass (Mn) of, e.g., about 500 to about 500,000 g/mole, preferably of about 1100 to about 300,000 g/mole.

Functional groups reactive towards isocyanate groups are groups with active hydrogen. The functional groups with active hydrogen may be for example hydroxyl groups, thiol groups, primary and/or secondary amino groups or combinations thereof. Compounds with hydroxyl groups and/or thiol groups are preferably used as component A).

The binders with hydroxyl groups are for example the polyurethanes, (meth)acrylic copolymers, polyesters, polyethers and alkyd resins known from polyurethane chemistry to the skilled person, which are used in the formulation of organic solvent based or aqueous coating compositions. They may each be used individually or in combination with one another.

In order to ensure sufficient water dilutability of the binders A) in case of water-based coating compositions, these binders are modified in a suitable manner to render them hydrophilic. The binders A) may be ionically (anionically and/or cationically) and/or non-ionically modified. An anionic modification and an anionic modification in combination with a non-ionic modification is preferred. Preferably, water-dilutable binders A) may contain carboxylic acid groups, sulfonic and/or phosphonic acid groups. Carboxylic acid groups are most preferred.

Examples of suitable polyurethane resins include all polyurethane resins which are suited for water-based coating compositions and known to a skilled person. Examples are polyurethane resins, for example, with a number average molar mass Mn of about 500 to about 500,000 g/mol, preferably, of about 1100 to about 300,000 g/mol, most preferably, of about 5000 to about 300,000 g/mol, an acid value of about 5 to about 100 mg KOH/g, preferably of about 20 to about 80 mg KOH/g, and a hydroxyl value of about 40 to about 400 mg KOH/g, preferably, of about 80 to about 250 mg KOH/g. Appropriate polyurethane resins which may be used are, for example, prepared by reacting compounds which are reactive with respect to isocyanate groups and polyisocyanates having at least 2 free isocyanate groups per molecule.

Polyols of high molecular weight can be used as compounds which are reactive with respect to isocyanate groups, preferably, polyester polyols, polyether polyols and/or polycarbonate polyols with a molecular weight of, for example, about 500 to about 6000 g/mol. Polyols of low molecular weight with a molecular weight of about 60 to about 400 g/mol can also be co-used. Aliphatic and/or cycloaliphatic diisocyanates can preferably be used as polyisocyanates. Examples of useful polyisocyanates are phenylene diisocyanate, xylylene diisocyanate, diphenylmethane diisocyanate, isophorone diisocyanate, dicyclohexylmethane diisocyanate, tetramethylene diisocyanate, hexamethylene diisocyanate.

The thus obtained polyurethane resins can still be subjected to chain extension to increase the molar mass. For example, NCO-functional polyurethane prepolymers can be reacted with compounds, which are reactive with respect to isocyanate groups. Compounds, which are reactive with respect to isocyanate groups, are in particular compounds with hydroxyl and/or secondary and/or primary amino groups. OH-functional polyurethane prepolymers can be chain extended for example with polyisocyanates.

The polyurethane resins include such resins that are in modified form, for example, as silicon-modified or (meth) acrylated polyurethane resins. Examples of polyurethane resins which may be used are described in U.S. Pat. No. 5,492,961, U.S. Pat. No. 5,141,987, U.S. Pat. No. 5,556,912, DE-A-41 15 042, U.S. Pat. No. 5,635,559, U.S. Pat. No. 5,691,425, DE-A-42 28 510, U.S. Pat. No. 5,854,337 and U.S. Pat. No. 4,489,135.

Examples of hydroxyl-functional poly(meth)acrylate resins include all (meth)acrylic copolymers which are suited for water-based coating compositions and known to a skilled person. For example, they can be those with a number average molar mass Mn of about 1000 to about 20000 g/mol, preferably, of about 1100 to about 15000, an acid value of about 5 to about 100 mg KOH/g, preferably, of about 15 to about 50 and a hydroxyl value of about 40 to about 400 mg KOH/g, preferably, of about 60 to about 200 mg KOH/g. The (meth)acrylic copolymers can also be prepared in the presence of different binders, e.g., in the presence of oligomeric or polymeric polyester and/or polyurethane resins.

The poly(meth)acrylate copolymer can be prepared by free-radical polymerization of polymerizable, olefinically unsaturated monomers, optionally, in presence of oligomeric or polymeric polyester and/or polyurethane resins. Free-radically polymerizable, olefinically unsaturated monomers, which may be used are monomers which, in addition to at least one olefinic double bond, also contain further functional groups and monomers which, apart from at least one olefinic double bond, contain no further functional groups. Further functional groups may be, for example, urea, hydroxyl, carboxyl, sulfonic acid, silane, amine, amide, acetoacetate or epoxy groups. It would be clear that only those functional groups can be combined in the poly(meth) acrylate copolymer which do not tend to self-crosslink.

Olefinically unsaturated monomers with hydroxyl groups are used to introduce hydroxyl groups into the (meth)acrylic copolymers. Suitable hydroxy-functional unsaturated monomers are, for example, hydroxyalkyl esters of alpha, beta-olefinically unsaturated monocarboxylic acids with primary or secondary hydroxyl groups. These may, for example, comprise the hydroxyalkyl esters of acrylic acid, methacrylic acid, crotonic acid and/or isocrotonic acid. The hydroxyalkyl esters of (meth)acrylic acid are preferred. Further olefinically unsaturated monomers with hydroxyl groups may, of course, also be used.

Carboxyl functional olefinically unsaturated monomers are used to introduce carboxyl groups into the (meth)acrylic copolymers. Examples of suitable olefinically unsaturated carboxylic acids include acrylic acid, methacrylic acid, crotonic acid and isocrotonic acid, itaconic acid, maleic acid, fumaric acid and the halfesters of the difunctional acids. Acrylic and methacrylic acid are preferred.

Unsaturated monomers which, apart from at least one olefinic double bond, contain no further functional groups are, for example, aliphatic esters of olefinically unsaturated carboxylic acids, such as (meth)acrylic acid, vinyl esters and/or vinylaromatic hydrocarbons such as styrene.

Also, other additional unsaturated monomers, which contain apart from an olefinic double bond further functional groups can be used.

Examples of (meth)acrylic copolymers which are suited for water-based coating compositions contemplated herein are one-stage or two-stage copolymers as described, e.g. in WO 2006/026671 and WO 2006/039430.

Examples of polyester resins which can be used as binder component A) include all polyester resins which are suited for organic solvent-based coating compositions, for example, hydroxyfunctional polyesters with a number average molar mass of about 500 to about 10,000 g/mol, preferably, of about 700 to about 8000 g/mol, an acid value of about 0 to about 50 mg KOH/g, and a hydroxyl value of about 40 to about 400 mg KOH/g, preferably, of 50-200 mg KOH/g. The polyesters may be saturated or unsaturated and they may optionally be modified with fatty acids. The polyesters are produced using known processes with elimination of water from polycarboxylic acids and polyalcohols or transesterification reaction of e.g dimethylesters of dicarboxylic acids with polyalcohols.

Particularly suitable polyesters are polyester oligomers having a number average molecular weight (Mn) of about 200 to about 3,000, preferably of about 400 to about 2,000, and a polydispersity of less than about 1.7. Useful polyester oligomers include polycaprolactone oligomers containing terminal hydroxyl groups which may be prepared by the ring-opening reaction of caprolactone with a polyol like, e.g, glycerine, trimethylolpropane, mono-pentaertythritol, in the presence of a catalyst, e.g., tin catalysts. Such caprolactone oligomers are well known and described at length in Anderson et al. U.S. Pat. No. 5,354,797.

Other useful oligomers include alkylene oxide polyester oligomers containing terminal hydroxyl groups which may be made by reacting one or more aliphatic, aromatic or cycloaliphatic monomeric anhydrides with a polyol in solution at elevated temperatures in the presence or absence of a suitable catalyst using standard techniques and then capping the acid oligomers so formed with monofunctional epoxies as e.g. alkylene oxides, glycidylesters and glycidylethers.

Cycloaliphatic monomeric anhydrides such as hexahydrophthalic anhydride and methyl hexahydrophthalic anhydride are typically employed in the oligomers above. Aliphatic or aromatic anhydrides, such as succinic anhydride or phthalic anhydride may also be used in conjunction with the anhydrides described above. Typically useful linear or branched polyols include ethyleneglycol, 1,3-propanediol, 1,2-propanediol, 1,4-butanediol, 1,5-pentanediol, 1,6-hexanediol, 1,4-cyclohexane dimethanol, trimethylol propane, glycerine, trimethylolethane, mono-, di- and tri-pentaerythritol. Useful monofunctional epoxies include alkylene oxides of 2 to 12 carbon atoms. Ethylene, propylene and butylene oxides are preferred. Other epoxy compounds, such as glycidylpivalate or glycidylversatate (Cardura® CE10P Hexion) may be used in conjunction with the monofunctional epoxies described above. Particularly preferred alkylene oxide oligomers are formed from methyl hexahydrophthalic anhydride; either 1,4-cyclohexanedimethanol, trimethylol propane, or pentaerythritol; and ethylene oxide reacted in stoichiometric amounts.

Furthermore suitable polyester oligomers can be prepared using a monoepoxyester, preferably a monoepoxyester of a branched polycarboxylic acid such as a tertiary fatty acid like C10 versatic acid blend in Cardura® CE10 or pivalic acid in glycidylpivalate. Those polyester oligomers can be synthesized by various routes, but preferably by employing a ring-opening polycondensation reaction in which a multifunctional polyol (preferably two to six-functional) or a blend of those polyols, so that the average functionality is at least two, are reacted with an anhydride and/or acid anhydride and further with a sufficient amount of a monoepoxyester to convert the acid groups into hydroxyl groups.

Suitable polyols for the above-mentioned synthesis are glycerine, trimethylolpropane, pentaerythritol, neopentyl glycol, ethyleneglycol, and the like. Suitable anhydrides for the above-mentioned synthesis include succinic anhydride, maleic anhydride, phthalic anhydride, hexahydrophthalic anhydride, methylhexahydrophthalic anhydride, and the like.

Suitable acid-anhydrides for the above-mentioned synthesis are trimellitic anhydride, hydrogenated trimellitic anhydride, the Diels-Alder adduct of maleic anhydride with sorbic acid, the hydrogenated Diels-Alder adduct of maleic anhydride and sorbic acid, and the like.

Suitable monoepoxyesters which can be used for the above-mentioned synthesis are the epoxyesters of benzoic acid, acetic acid, pivalic acid (Cardura® CE5), versatic acid (Cardura® CE10), isobutyric acid (Cardura® CE4).

Compatible blends of any of the aforementioned polyester oligomers can be used as well in the hydroxyl component A).

Thiol-functional compounds A) that can be used in the coating composition contemplated herein are compounds in the form of low molar mass compounds defined by empirical and structural formula with molar mass in the range of about 200 to about 600 or oligomeric or polymeric binders. The binders are compounds with a number average molar mass (Mn) of, e.g., about 500 to about 500,000 g/mole, preferably of about 1100 to about 300,000 g/mole.

Thiol-functional compounds A) that can be used in the coating composition are esters of a thiol-functional carboxylic acid with a polyol, such as esters of 2-mercaptoacetic acid, 3-mercaptopropionic acid, 2-mercapto-propionic acid, 11-mercaptoundecanoic acid, and mercaptosuccinic acid. Examples of such esters include pentaerythritol tetrakis (3-mercaptopropionate), pentaerythritol tetrakis (2-mercaptoacetate), trimethylol propane tris (3-mercaptopropionate), trimethylol propane tris (2-mercaptopropionate), and trimethylol propane tris (2-mercaptoacetate). A further example is a compound of a hyperbranched polyol core based on a starter polyol, e.g. trimethylol propane and dimethylol propionic acid, which is subsequently esterified with 3-mercaptopropionic acid and isononanoic acid. Those compounds are described for example in EP 0 448 224.

The compounds A) can be used individually or in combination.

Component A) of the coating compositions contemplated herein can also contain reactive monomers of low molecular weight, so-called reactive thinners, which are able to act as a solvent and can react with the cross-linking components. Examples of those compounds are hydroxy-, thiol- or amino-functional reactive thinners.

The coating compositions contain polyisocyanates with free isocyanate groups as cross-linking agents (component B). Examples of the polyisocyanates are any organic polyisocyanates with aliphatically, cycloaliphatically, araliphatically and/or aromatically bound free isocyanate groups. The polyisocyanates are liquid at room temperature or become liquid through the addition of organic solvents. At 23° C., the polyisocyanates generally have a viscosity of about 1 to about 6,000 mPas, preferably, above about 5 and below about 3,000 mPas.

The preferred polyisocyanates are polyisocyanates or polyisocyanate mixtures with exclusively aliphatically and/or cycloaliphatically bound isocyanate groups with an average NCO functionality of 1.5 to 5, preferably 2 to 4.

Examples of particularly suitable polyisocyanates are what are known as "paint polyisocyanates" based on hexamethylene diisocyanate (HDI), 1-isocyanato-3,3,5-trimethyl-5-isocyanatomethyl-cyclohexane (IPDI) and/or bis (isocyanatocyclohexyl)-methane and the derivatives known per se, containing biuret, allophanate, urethane and/or isocyanurate groups of these diisocyanates which, following production, are freed from surplus parent diisocyanate, preferably by distillation, with only a residue content of less than 0.5% by weight. Triisocyanates, such as, triisocyanatononan can also be used.

Sterically hindered polyisocyanates are also suitable. Examples of these are 1,1,6,6-tetramethyl-hexamethylene diisocyanate, 1,5-dibutyl-penta-methyldiisocyanate, p- or m-tetramethylxylylene diisocyanate and the appropriate hydrated homologues.

In principle, diisocyanates can be converted by the usual method to higher functional compounds, for example, by trimerization or by reaction with water or polyols, such as, for example, trimethylolpropane or glycerine. The polyisocyanates can also be used in the form of isocyanate-modified resins.

The polyisocyanate cross-linking agents can be used individually or in combination.

The polyisocyanate cross-linking agents are those commonly used in the paint industry, and are described in detail in the literature and are also obtainable commercially.

The catalyst component C) comprises a combination of binder compound C1) and catalyst C2) as defined above. The catalyst component C) behave like a latent cure catalyst. It is assumed that catalyst C1) is immobilized in the binder compound C2) and is thus not or virtually not able to display its catalytic effect on the cross-linking reaction between components A) and B). Catalyst C1) becomes active only during and/or after film formation of the applied coating composition and/or during curing of the applied coating composition.

Catalyst component C) can comprise about 0.05 to about 20% by weight, preferred about 0.1 to about 10% by weight, more preferred about 1.0 to about 5.0% by weight of catalyst C1), and about 99.95 to about 80% by weight, preferred about 99.9 to about 90% by weight, more preferred about 99 to about 95% by weight of binder compound C2), wherein the % by weight are based on the total amount of catalyst component C).

Preferably the solids content of catalyst component C) consists of the combination of catalyst C1) and binder compound C2).

Since the binder compound C2) is usually used in form of an aqueous dispersion or an organic dispersion or solution, the catalyst component C) may contain in addition to the catalyst C1) and the binder compound C2) water and/or at least one organic solvent. Catalyst component C) may contain, for example about 40 to about 60% % by weight of water and/or organic solvents, based on the total amount of catalyst component C).

The catalyst C1) is an organo-metal compound. Suitable catalysts are all organo-metal compounds capable of accelerating the reaction of the functional groups of component A) with the isocyanate groups of the isocyanate-functional compound B).

The organo-metal compounds are metal salts and/or complexes of organic compounds. The organic compounds are compounds having 2 to 40 carbon atoms, optionally comprising atoms such as O, N, and S. The catalyst is preferably a metal compound wherein the metal is a metal of groups 3 to 15 of the Periodic Table. The metal salts comprise anions selected from the group of carboxylates. Examples thereof include propionate, butyrate, pentanoate, 2-ethyl hexanoate, naphthenate, oxalate, malonate, succinate, glutamate, and adipate. The catalyst can be a metal compound with an organic ligand where the metal is a metal of groups 3 to 15 of the Periodic Table.

The metal complexes comprise ligands selected from the group of beta-diketones, alkyl acetoacetates, alcoholates, and combinations thereof. Examples thereof include acetyl acetone (2,4-pentanedione), 2,4-heptanedione, 6-methyl-2,4-heptadione, 2,4-octanedione, propoxide, isopropoxide, and butoxide. Preferably, the metal compound is a metal complex. Examples of metals include aluminium, titanium, zirconium, and hafnium.

In case of thiol-functional components A) the metal is preferably a transition metal. More preferably, the metal is a metal of Period 4 of the Periodic Table, e.g., zirconium or titanium.

In case of hydroxyl-functional components A) the metal is preferably tin, zinc, bismuth and zirconium. Most preferred are tin and zirconium.

Examples of metal complexes include aluminium complexed with 2,4-pentanedione, aluminium triacetyl acetonate, zirconium tetraacetyl acetonate, zirconium tetrabutanolate, titanium tetrabutanolate, titanium acetylacetonate, zirconium complexed with 6-methyl-2,4-heptadione, aluminium triisopropoxide, and titanium diisopropoxide bis-2,4(pentadionate) and bismuth octanoate. Those metal complexes are commercially available, for example, under the trade name Tyzor® from DuPont or K-KAT® XC6212 from King Industries or Liovac® 3024 from NRC.

Examples of tin catalysts are organotin carboxylates, e.g. dialkyl tin carboxylates of aliphatic carboxylic acids, such as dibutyl tin dilaurate (DBTL), dibutyltin diacetate, and dibutyltin oxide or dioctyltin oxide.

Catalyst C1) can be a single catalyst or a combination of catalysts. Appropriate catalysts have to be selected depending on the specific curing chemistry.

The binder compound C2) has a glass transition temperature Tg of ≥about 20° C., preferably of ≥about 30° C., for example a glass transition temperature Tg of about 20° C. to about 70° C., preferably of about 30° C. to about 65° C., wherein the glass transition temperature Tg of binder compound C2) is above the temperature at which the two-component coating composition is applied. It is preferably about 10° C., more preferred about 20° C. above the temperature at which the two-component coating composition is applied. The binder compound II) may have, for example, a glass transition temperature Tg of about 20° C. to about 70° C., preferably of about 30° C. to about 65° C. Two-component and other coating compositions are usually applied at room temperature or ambient temperature. Room temperature and ambient temperature are usually in a range of from about 10 to about 30° C., preferably about 15 to about 25° C. for coating applications. Any binder having the above defined Tg is suitable as binder compound II).

Preferably binder compound C2) is at least one (meth) acrylic copolymer, at least one polyester or a mixture of both. (Meth)acrylic copolymers are most preferred.

Suitable (meth)acrylic copolymers and polyesters are those as described above for binder component A). In particular suitable (meth)acrylic copolymers and polyesters have a hydroxyl number of, e.g., about 20 to about 200 mg KOH/g solids, preferably of about 80 to about 130 mg KOH/g solids and an acid number of about 20 to about 50 mg KOH/g solids. (Meth)acrylic copolymers produced in two stages, as disclosed, for example, in EP 1784463, are also highly suitable as acrylic or methacrylic copolymers.

Generally the binder compound C2) should be selected so as to be chemically similar to the main binder A), in order to guarantee good compatibility. Also, those binders C2), in particular those (meth)acrylic copolymers should be selected which have a reduced reactivity compared to the reactivity of the main binder component A). Reduced reactivity can be achieved, for example, by reducing the hydroxyl number of the binder and/or by amending the ratio primary hydroxyl groups:secondary hydroxyl groups.

The catalyst component C) is contained in the coating composition in an amount that is effective in catalyzing the cross-linking reaction of the coating composition under the conditions of ambient temperature or thermal cure, or to be more precise, in catalyzing the cross-linking reaction between binder component A) and cross-linker component B) under curing conditions. The catalyst component C) is contained in the coating composition in a proportion of, for example, about 1 to about 25% by weight, preferably about 1 to about 10% by weight, based on the total amount of the coating composition. A skilled person can select appropriate proportion of component C), preferably within the range, dependent on the type and the content of the catalyst C1) in the catalyst component C) and the reactivity of the coating composition's cross-linking system. The catalyst C1) does not or virtually not (only marginally) catalyze the cross-linking reaction directly after having mixed it with the reactive components A) and B) or after having mixed component A) containing the catalyst with component B). In other words, the catalyst C1) in the catalyst component C) behaves essentially passive as long as the ambient temperature, in particular the temperature of application of the coating composition is below the glass transition temperature Tg of binder compound C2). Preferably the Tg of binder compound C2) is at least about 10° C., more preferred at least about 20° C. above the temperature at which the coating composition is applied.

The catalyst component C) may be produced as follows:
The binder compound C2) is produced in the organic medium in a conventional manner by forming a solution or dispersion in one or more organic solvents. The organic solution or dispersion of the binder compound C2) is then mixed with the catalyst C1). The mixture can subsequently be converted into the aqueous phase, the binder C2) being neutralized prior to or during the conversion into the aqueous phase.

The coating compositions contemplated herein may contain in addition one or more compounds or binders D) which contribute towards the solids content of the coating composition. Examples of additional binders are physically drying resins or resins which may be chemically cured by reactions other than the addition reaction of isocyanate groups with groups reactive with isocyanate groups.

The molar ratio of groups reactive towards isocyanate groups of the cross-linking agent B), in particular the hydroxyl or thiol groups from the at least one compound A) to the isocyanate groups from the at least one cross-linking agent B), are for example, about 0.5:1 to about 3:1, in particular about 0.7:1 to about 2:1.

The coating compositions can have a solids content of, for example, about 40 to about 85 wt. %, preferably about 45 to about 75 wt. %.

The coating compositions furthermore can contain water and/or at least one organic solvent. Water-based coating compositions contain, for example, about 30 to about 60% by weight of water, and possibly small amounts of organic solvents, e.g., up to about 15% by weight, preferably, up to about 10% by weight based on the entire coating composition.

The organic solvents are solvents conventionally used in coating techniques. These may originate from the preparation of the binders or are added separately. Examples of suitable solvents are monohydric or polyhydric alcohols, e.g., propanol, butanol, hexanol; glycol ethers or esters, for example, diethylene glycol dialkyl ether, dipropylene glycol dialkyl ether, each with C1- to C6-alkyl, ethoxypropanol, butyl glycol; glycols, for example, ethylene glycol, propylene glycol, N-methyl pyrrolidone and ketones, e.g., methyl ethyl ketone, acetone, cyclohexanone.

The coating compositions contemplated herein can contain pigments, fillers and/or usual coating additives. All colour and/or special effect-giving pigments of organic or inorganic type used in paints are suitable for pigments. Examples of inorganic or organic colour pigments are titanium dioxide, micronized titanium dioxide, iron oxide pigments, carbon black, azo pigments, phthalocyanine pigments, quinacridone or pyrrolopyrrole pigments. Examples of special effect pigments are metal pigments, for example, from aluminum or copper, interference pigments, such as, for example, aluminum coated with titanium dioxide, coated mica, and graphite effect pigments. Examples of fillers are silicon dioxide, barium sulfate, talcum, aluminum silicate and magnesium silicate.

The additives are additives usually used in the paint industry. Examples of such additives are light stabilizers, for example, based on benztriazoles and HALS (hindered amine light stabilizer) compounds, flow control agents based on (meth)acrylic homopolymers or silicon oils, rheology-influencing agents, such as, highly disperse silicic acid or polymeric urea compounds, thickeners, such as, cross-linked polycarboxylic acid or polyurethanes, anti-foaming agents, wetting agents, photoinitiators. The additives are added in the usual amounts familiar to the person skilled in the art. Even if not preferred, apart from catalyst component C) the coating composition may contain further conventional curing catalysts.

The coating composition can be produced by conventional methods. In case of water-based coating compositions it is preferably produced as follows:

The main binder A) is produced in the aqueous phase or is produced in an organic phase and subsequently converted into the aqueous phase by forming an aqueous dispersion or emulsion. The aqueous dispersion or emulsion of the main binder A) is mixed with the catalyst component C) present in the aqueous phase. For example, a ratio of solids content binder A) to solids content binder C2) of about 7:1 to about 99:1, preferably of about 10:1 to about 50:1 can be used. The mixture thus produced can subsequently be completed with the further paint components, such as additives and/or pigments. It is then mixed with the cross-linking component B) shortly before application.

The coating compositions may be used for the production of single-layer coatings or for the production of one or more coating layers within a multilayer coating, such as, in particular, an automotive multilayer coating, either on an automotive body or on an automotive body part. This may relate to both original and repair coating applications. The coating compositions may in particular be used in pigmented form for the production of a primer layer or a single stage top coat layer or in pigment-free form for the production of an outer clear top coat layer or a transparent sealing layer of a multilayer coating. They may, for example, be used for the production of a clear top coat layer on a previously applied color-imparting and/or special effect-imparting pre-dried base coat layer.

The coating compositions contemplated herein may be applied by means of conventional application methods, in particular, by spraying onto any desired uncoated or pre-coated substrate, for example, of metal or plastics. After application the coating layer is preferably initially be flashed off, to remove water and optionally organic solvent. Flash-off times of about 10 to about 40 minutes, preferably of about 15 to about 30 minutes can be used.

The applied coating layer is then cured by the catalyzed cross-linking reaction of the cross-linkable binder A) and the cross-linker B). Curing may proceed at ambient temperature, e.g. at about 20° C., or preferably at temperatures of, for example, about 30 to about 150° C., in particular of about 40 to about 80° C., within, for example, about 5 to about 30 minutes (complete drying time including flash-off time and curing time: about 30 to about 45 minutes). Curing can be performed, for example, by heat or radiation, e.g. by IR radiation.

It is assumed that the catalyst is present in the aqueous phase in the oil droplets formed by the binder compound C2), and thus, is separated from the oil droplets formed by main binder A). If the difference between the glass transition temperature Tg of binder compound C2) and the temperature of application and/or curing is sufficiently large, the catalyst C1) is inactive or less active before application and becomes active to catalyze the curing reaction during and/or after film formation and/or during curing.

Surprisingly, it has been found that acceptable short total drying times (flash-off time+drying time) can be achieved with the coating compositions contemplated herein. In particular in case of water-based coating compositions coatings are achieved without surface defects appearing in the resulting paint film. Water-based coating compositions contemplated herein can, for example, be processed with flash-off times of approximately 20 minutes at ambient temperature and drying times of approximately 10 minutes at 60° C., without any losses with regard to the surface quality and the hardness. The total drying time is roughly the same as usual for corresponding coating compositions of prior art while guaranteeing an acceptable pot life. The reduced curing time allows to extend the flash-off time while maintaining the same total drying time. Extending the flash-off time on the other hand leads to better surface appearance without pinholes.

The improved pot life of the coating compositions contemplated herein is also advantageous. Generally a rapid reaction occurs between the hydroxyl-functional and/or thiol-functional binder and the polyisocyanate cross-linking agent when mixed with one another, in particular when a curing catalyst is present. The pot life of the coating compositions after mixing components A and B and C amounts, for example, to up to 4 hours.

EXAMPLES

Example 1

Preparation of Binder Compound C2)
((Meth)Acrylic Copolymer)

In a reactor with a propeller type of stirrer, a thermometer, a condenser and a monomer/initiator feeding system 327 grams of Cardura E10 (Glycidylester of C10 versatic acid available from Hexion) and 109 grams of EPR were loaded and heated to about 145° C. A mixture of 147 grams acrylic acid, 17 grams of HEMA, 263 grams of styrene, 75 g of isobornyl methacrylate, 65 grams of Cardura E10, 17 grams of dicumyl peroxide and 136 grams of EPR was added over 2.5 hours to the reactor while keeping the temperature at 145° C. After the feed, the reactor was held 1 hour at 145° C. Then a mixture of 90 grams of HEMA, 61 grams of acrylic acid, 280 grams of IBMA, 270 grams of isobornyl methacrylate, 9 grams of dicumyl peroxide and 50 grams of EPR were added over 2.5 hours at 145° C., followed by a rinsing step for the feed system of 66 grams of EPR. After the rinsing step, the contents of the reactor was kept for 4.5 hours at 145° C.
Test Results:
  Solids content: 79.3%
  Acid value: 44.5 mg KOH/g solids
  Glass transition temperature Tg: 42° C.
(measured by DSC at a heating rate of 10K/min; Tg=TgEE as defined in standard DIN 53 765)

Example 2

2.1 Preparation of Catalyst Compound Ca)

In a reactor with a propeller type of stirrer, a thermometer, a condenser and a dropping funnel 2000 grams of binder compound C2) prepared according to Example 1 were heated to 95°. Then 15.9 grams of dibutyl tin dilaurate ($1.6 \times 10^{-5}$ mol/g solids of C2) were added and homogenized within 20 minutes. Then 100.3 grams of dimethylethanolamine were added and homogenized within 15 minutes. Then 2400 grams of dionised water were added over 60 minutes and the solids content of the resin was adjusted with another 240 grams of deionised water.
Test Results:
  Solids: 35.6%
  Acid value: 45.1 mg KOH/g solids
  Hydroxy value: 85 mg KOH/g solids (calculated)
  MEQ amine: 69.7 meq/100 g 2.2 Preparation of Catalyst Compound Cb)

In a reactor with a propeller type of stirrer, a thermometer, a condenser and a dropping funnel 1810 grams of binder component C2 prepared according to (Example 1. were heated to 95°. Then 33.5 grams of Tyzor ZEC® (Available from DuPont®) ($2.5*10^{-5}$ mol/g solids of C1) were added and homogenized within 20 minutes. Then 91.2 grams of dimethylethanolamine were added and homogenized within 15 minutes. Then 2300 grams of dionised water were added over 60 minutes.
Test Results:
  Solids: 34.7%
  Acid value: 45.2 mg KOH/g solids
  MEQ amine: 71.6 meq/100 g Example 3

Preparation of Binder Component A)

In a reactor with a propeller type of stirrer, a thermometer, a condenser and a monomer/initiator feeding system 200 grams of Cardura E10 (Glycidylester of C10 versatic acid available from Hexion) and 90 grams of EPR were loaded and heated to about 150° C. A mixture of 68 grams acrylic acid, 52 grams of HEMA, 160 grams of styrene, 40 grams of Cardura E10, 10 grams of dicumyl peroxide and 40 grams of EPR was added over 2.5 hours to the reactor while keeping the temperature at 150° C. After the feed, the reactor was held 1 hour at 150° C. Then a mixture of 108 grams of HEMA, 30.4 grams of acrylic acid, 142 grams of IBMA, 5 grams of dicumyl peroxide and 45 grams of EPR were added over 2.5 hours at 150° C., followed by a rinsing step for the feed system of 5 grams of EPR. After the rinsing step, the contents of the reactor were kept for 2 hours at 150° C. The reactor content was cooled to 100° C. and 100 grams of EPR were distilled off. In a next step 33 grams of dimethylethanolamine were added for a theoretical acid value of 20.5, the amount corrected for the measured acid value.

The polymer blend was diluted with 865 grams of water preheated at about 70° C.
Test Results:
  Solids: 45.1%
  Acid value: 33.6 mg KOH/g solids
  Hydroxy value: 154 mg KOH/g solids (calculated)
  pH: 8.2
EPR: Ethoxy propanol; HEMA: Hydroxyethyl methacrylate; IBMA: Isobutyl methacrylate; BGA: Butylglycolacetate Example 4

Preparation of Clear Coat Compositions 4.1 as Contemplated Herein:
69.7 grams of binder A) prepared according to Example 3), 10.0 grams of catalyst compound Ca) prepared according to example 2.1 and 6.3 grams of butoxy propanol were mixed together as base paint. The hardener was obtained by mixing together 19.6 grams of Desmodur® XP 2410 and 4.9 grams of BGA. After mixing together base paint and hardener the activated paint was diluted with 31 grams of water to application viscosity.

4.2 As Contemplated Herein:
76.9 grams of binder A prepared according to Example 3), 10.0 grams of catalyst compound Cb) prepared according to example 2.2 and 6.93 grams of butoxy propanol were mixed together as base paint. The hardener was obtained by mixing together 19.6 grams of Desmodur® XP 2410 and 4.9 grams of BGA. After mixing together base paint and hardener the activated paint is diluted with 32 grams of water to application viscosity.

4.3 Comparison: Without Catalyst 77.8 grams of binder A prepared according to Example 3 and 6.93 grams of butoxy propanol were mixed together as base paint. The hardener was obtained by mixing together 19.6 grams of Desmodur® XP 2410 and 4.9 grams of BGA. After mixing together base paint and hardener the activated paint is diluted with 20 grams of water to application viscosity.

4.4 Comparison: With Free Catalyst 77.8 grams of binder A prepared according to Example 3 and 6.93 grams of butoxy propanol were mixed together as base paint. The hardener was obtained by mixing together 19.6 grams of Desmodur® XP 2410, 6.4 milligrams of Tyzor ZEC® and 4.9 grams of BGA. After mixing together base paint and hardener the activated paint is diluted with 21 grams of water to application viscosity.

Example 5

Application of Clear Coats

The clear coat compositions and comparative clear coat compositions 4.1 to 4.4 have been applied with a doctor blade to glass panels in a resulting dry film thickness of about 40 μm. Drying performance has been determined via pendulum hardness after 10-30 min flash-off time and curing at 60° C. within 30-10 min.

Measurement results are given in Table 1.

TABLE 1

| Example | CC 4.1 | CC 4.2 | CC 4.3 (Comparison) | CC 4.4 (Comparison) |
|---|---|---|---|---|
| Flash off time | 30 min | 30 min | 30 min | 30 min |
| Cure time | 10 min | 10 min | 10 min | 10 min |
| Hardness* after: | | | | |
| 1 h | 19 | 17 | 9 | 11 |
| 2 h | 26 | 24 | 13 | 16 |
| 3 h | 37 | 34 | 25 | 28 |
| 4 h | 47 | 46 | 38 | 37 |
| 24 h | 126 | 126 | 108 | 107 |
| 7 d | 138 | 139 | 104 | 114 |

*Pendulum hardness determined according to DIN EN ISO 1522: 2006

As can be seen from the results in Table 1 the use of the clear coat compositions contemplated herein leads, in the same overall drying time, to coatings with earlier hardness and improved hardness development. Specifically the coating compositions CC 4.1 and 4.2 show a higher initial hardness (1 hour after cure) and a higher final hardness (7 days after bake). The CC 4.3 without catalysts shows less hardness due to low reactivity. The free catalysts gives also lower hardness.

The development of the NCO content of the activated paint is shown in Table 2.

TABLE 2

| Example | CC 4.1 | CC 4.2 | CC 4.3 (Comparison) | CC 4.4 (Comparison) |
|---|---|---|---|---|
| 0 h | 2.17 | 2.28 | 2.47 | 2.01 |
| 1 h | 1.98 | 2.13 | 2.33 | 1.89 |
| 2 h | 1.78 | 2.07 | 2.30 | 1.75 |
| 3 h | 1.75 | 1.91 | 2.17 | 1.55 |
| 4 h | 1.62 | 1.75 | 1.75 | 1.41 |

It is shown, that the NCO-consumption for the encapsulated catalysts is slower than for the free catalyst. A slower NCO consumption on the other hand means a longer pot life. The initial determination of the NCO content at time "0 hours" includes a sample preparation time of about 10 minutes. In case of the composition with the free catalyst the NCO consumption has started immediately after mixing reactive components A) and B) while the NCO consumption in the coating compositions contemplated herein is slowed down. After 4 hours the NCO consumption in the coating compositions contemplated herein is comparable with the NCO consumption of the non-catalyzed coating composition.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. Two-component coating composition, comprising:
    A) a cross-linkable binder compound ("cross-linkable binder compound A)") having a functional group reactive towards isocyanate groups,
    B) a cross-linking agent having a free isocyanate group and
    C) from about 1 to about 10%, by weight, of a catalyst component ("catalyst component C)"), based on the total weight of the coating composition, the catalyst component comprising:
        C1) a catalyst ("catalyst C1") for a curing reaction between the functional group of component A) and the isocyanate group of component B), said catalyst being an organo-metal catalyst, and
        C2) an oligomeric or polymeric binder compound ("binder compound C2)") having a glass transition temperature Tg of ≥about 20° C., measured by DSC (differential scanning calorimetry) at a heating rate of about 10 K/min, wherein the catalyst C1 is passivated by being immobilized in the binder compound C2 at a temperature below the Tg of the binder compound C2.

2. The coating composition of claim 1 wherein the catalyst component C is a latent catalyst such that the binder compound C2 frees the catalyst C1 from being immobilized in the binder compound C2 at a temperature above the Tg of the binder compound C2.

3. The coating composition of claim 1, wherein the glass transition temperature of the binder compound C2) is at least about 20° C. above an application temperature, wherein the application temperature is from about 15 degrees centigrade to about 25 degrees centigrade.

4. The coating composition of claim 1, wherein the glass transition temperature Tg of the binder compound C2) is ≥about 30° C.

5. The coating composition of claim 1, wherein the glass transition temperature Tg of the binder compound C2) is about 20 to about 70° C.

6. The coating composition of claim 1, wherein the coating composition is a water-based coating composition.

7. The coating composition of claim 1, wherein the catalyst component C) comprises about 0.05 to about 20% by weight of catalyst C1) and about 99.95 to about 80% by weight of binder compound C2), wherein the % by weight are based on the total amount of catalyst component C).

8. The coating composition of claim 7, wherein the catalyst component C) comprises about 0.1 to about 10% by weight of catalyst C1) and about 99.9 to about 90% by weight of binder compound C2), wherein the % by weight are based on the total amount of catalyst component C).

9. The coating composition of claim 1, wherein the organo-metal catalyst C1) comprises a metal salt and/or a metal complex of organic compounds.

10. The coating composition of claim 9, wherein the metal complex comprises ligands selected from the group of beta-diketones, alkyl acetoacetates, alcoholates, and combinations thereof.

11. The coating composition of claim 10, wherein the metal complex comprises aluminum, titanium, zirconium or hafnium.

12. The coating composition of claim 1, wherein the organo-metal catalyst C1) comprises an organo-tin carboxylate.

13. The coating composition of claim 1, wherein the binder compound C2) comprises a (meth)acrylic copolymer, a polyester or a combination thereof.

14. The coating composition of claim 1, wherein the cross-linkable binder compound A) comprises compounds selected from the group comprising hydroxyl-functional compounds, thiol-functional compounds, and combinations thereof.

15. A vehicle body part having thereon a two-component coating composition comprising:
   A) a cross-linkable binder compound ("cross-linkable binder compound A)") having a functional group reactive towards isocyanate groups,
   B) a cross-linking agent having a free isocyanate group and
   C) from about 1% to about 10%, by weight, of a catalyst component ("catalyst component C)"), based on the total weight of the coating composition, the catalyst component comprising:
      C1) a catalyst ("catalyst C1)") for a curing reaction between the functional group of component A) and the isocyanate group of component B), said catalyst being an organo-metal catalyst, and
      C2) an oligomeric or polymeric binder compound ("binder compound C2)") having a glass transition temperature Tg of ≥about 20° C., measured by DSC (differential scanning calorimetry) at a heating rate of about 10 K/min, wherein the catalyst C1 is passivated by being immobilized in the binder compound C2 at a temperature below the Tg of the binder compound C2.

16. A process for coating a substrate, the process comprising the steps of:
   I) applying a coating layer of a two-component coating composition to a substrate at application temperature $T_A$, the two-component coating composition comprising:
      A) a cross-linkable binder compound ("cross-linkable binder compound A)") having a functional group reactive towards isocyanate groups,
      B) a cross-linking agent having a free isocyanate group and
      C) from about 1% to about 10%, by weight, of a catalyst component ("catalyst component C)"), based on the total weight of the coating composition, the catalyst component comprising:
         C1) a catalyst ("catalyst C1)") for a curing reaction between the functional group of component A) and the isocyanate group of component B), said catalyst being an organo-metal catalyst, and
         C2) an oligomeric or polymeric binder compound ("binder compound C2)") having a glass transition temperature Tg of ≥about 20° C., measured by DSC (differential scanning calorimetry) at a heating rate of about 10 K/min, wherein the catalyst C1) is passivated by being immobilized in the binder compound C2); and
   II) curing said coating layer,
wherein the glass transition temperature Tg of the binder compound C2) is above the application temperature $T_A$.

* * * * *